US008489082B2

(12) United States Patent
Kawai (10) Patent No.: US 8,489,082 B2
(45) Date of Patent: Jul. 16, 2013

(54) WIRELESS CONNECTION SETTING PROGRAM

(75) Inventor: Sunao Kawai, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1726 days.

(21) Appl. No.: 11/383,336

(22) Filed: May 15, 2006

(65) Prior Publication Data

US 2006/0259667 A1    Nov. 16, 2006

(30) Foreign Application Priority Data

May 13, 2005    (JP) .................................. 2005-141323

(51) Int. Cl.
*H04M 3/00*    (2006.01)

(52) U.S. Cl.
USPC ......... 455/418; 455/420; 455/426.1; 370/328

(58) Field of Classification Search
USPC ........................ 455/418, 420, 426.1; 370/328
See application file for complete search history.

(56) References Cited

U.S. PATENT DOCUMENTS

| 7,224,802 B2 | 5/2007 | Hosaka |
| 2003/0091015 A1 | 5/2003 | Gassho |
| 2003/0092395 A1 | 5/2003 | Gassho et al. |
| 2003/0154287 A1 | 8/2003 | Sullivan |
| 2004/0229606 A1* | 11/2004 | Oshima et al. ............. 455/426.2 |
| 2005/0066072 A1 | 3/2005 | Nakamura |
| 2005/0070225 A1* | 3/2005 | Lee .............................. 455/41.3 |

FOREIGN PATENT DOCUMENTS

| EP | 1489502 A | 12/2004 |
| JP | 1999327830 A | 11/1999 |
| JP | 2003143156 A | 5/2003 |
| JP | 2003-218730 A | 7/2003 |
| JP | 2003-299146 A | 10/2003 |
| JP | 2004086492 A | 3/2004 |
| JP | 2004-179872 A | 6/2004 |
| JP | 2005-115926 A | 4/2005 |

OTHER PUBLICATIONS

Japanese Patent Office, Notification of Reasons of Rejection in Japanese Patent Application No. 2005-141323 (counterpart to the above-captioned U.S. patent application), dated Jan. 22, 2008.
Japanese Patent Office, Notification of Reasons for Rejection of Japanese Patent Application No. 2005-141323 (counterpart to the above-captioned US patent application, mailed Apr. 15, 2008.
European Patent Office, European Search Report for EP Appl'n No. 06252493.9-2416 (counterpart to above-captioned patent appl'n) mailed Aug. 22, 2006.

* cited by examiner

*Primary Examiner* — Danh Le
(74) *Attorney, Agent, or Firm* — Baker Botts L.L.P.

(57) ABSTRACT

A computer program product comprises computer readable instructions that cause a computer configured wirelessly connectable with at least one device to execute a wireless connection setting process. The wireless connection setting process comprises establishing a wireless connection with the at least one device, transmitting externally inputted settings of the wireless connection to the at least one device, and configuring the same settings as the settings transmitted to the at least one device for the computer.

18 Claims, 7 Drawing Sheets

WIRELESS CONNECTION SETTING PROGRAM

CROSS-REFERENCE TO RELATED APPLICATION

This application claims priority under 35 U.S.C. §119 from Japanese Patent Application No. 2005-141323, filed May 13, 2005. The entire subject matter of the application is incorporated herein by reference.

BACKGROUND

1. Technical Field

The following description relates to one or more techniques that may be used for setting a computer capable of using one or more devices wirelessly connected therewith.

2. Related Art

Conventionally, in general, when setting a personal computer provided with a wireless communication function to be able to use a peripheral device provided with the wireless communication function such as a printing device including a printer and a Multi Function Peripheral (MFP), first, a user makes the personal computer run a setup wizard that is a program for configuring various settings of a wireless connection with the device.

Figure 8:
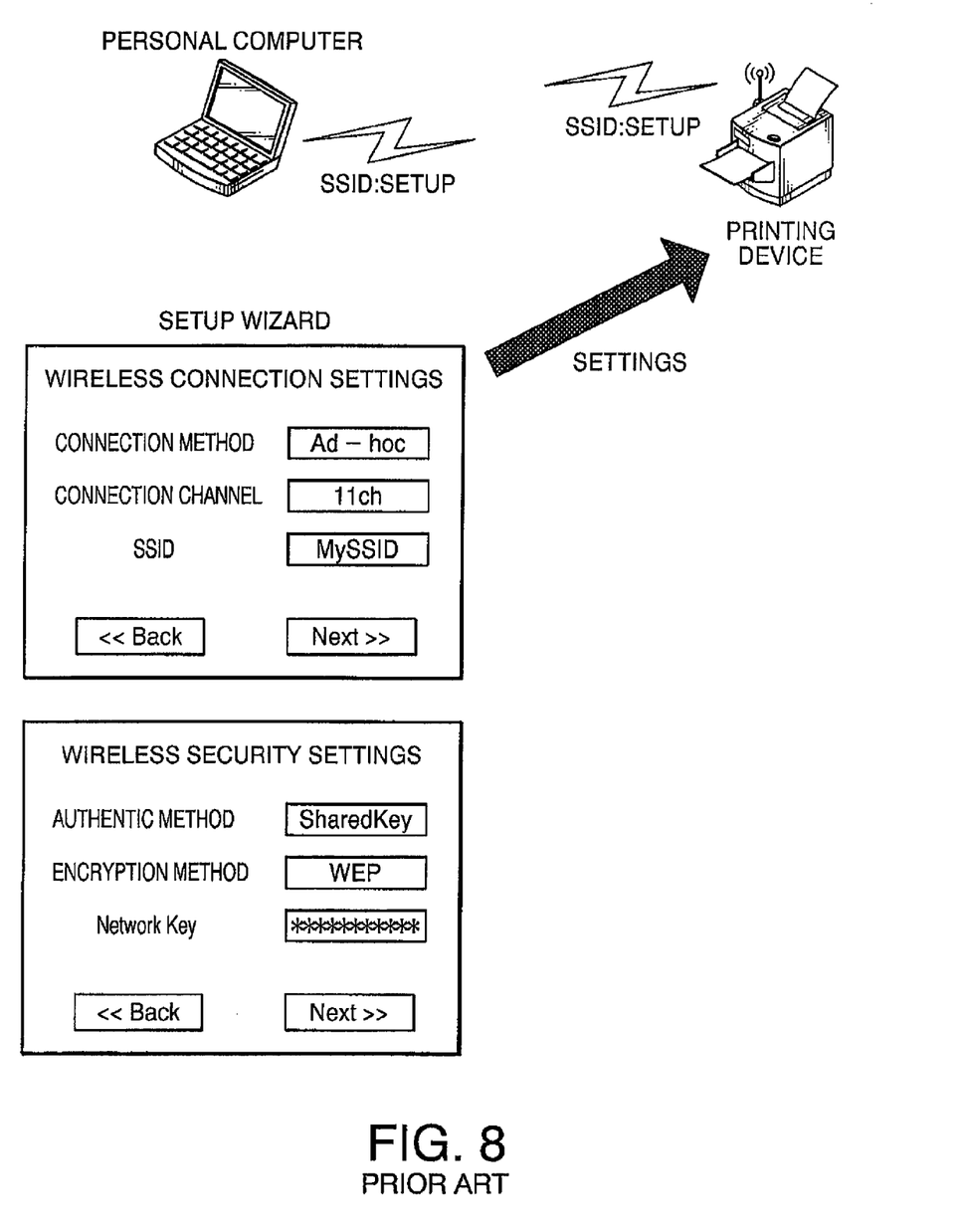
FIG. 8 is an illustration schematically showing a conventional setup wizard.

According to this setup wizard, the personal computer, as shown in FIG. 8, changes the settings of the wireless connection therefore to default settings (SETUPs) to establish a temporary wireless connection with the device based upon the default settings. Then, the personal computer transmits settings inputted by the user to the device to configure the settings of the wireless connection for the device. It is noted that FIG. 8 is an illustration schematically showing the conventional setup wizard.

Figure 9:
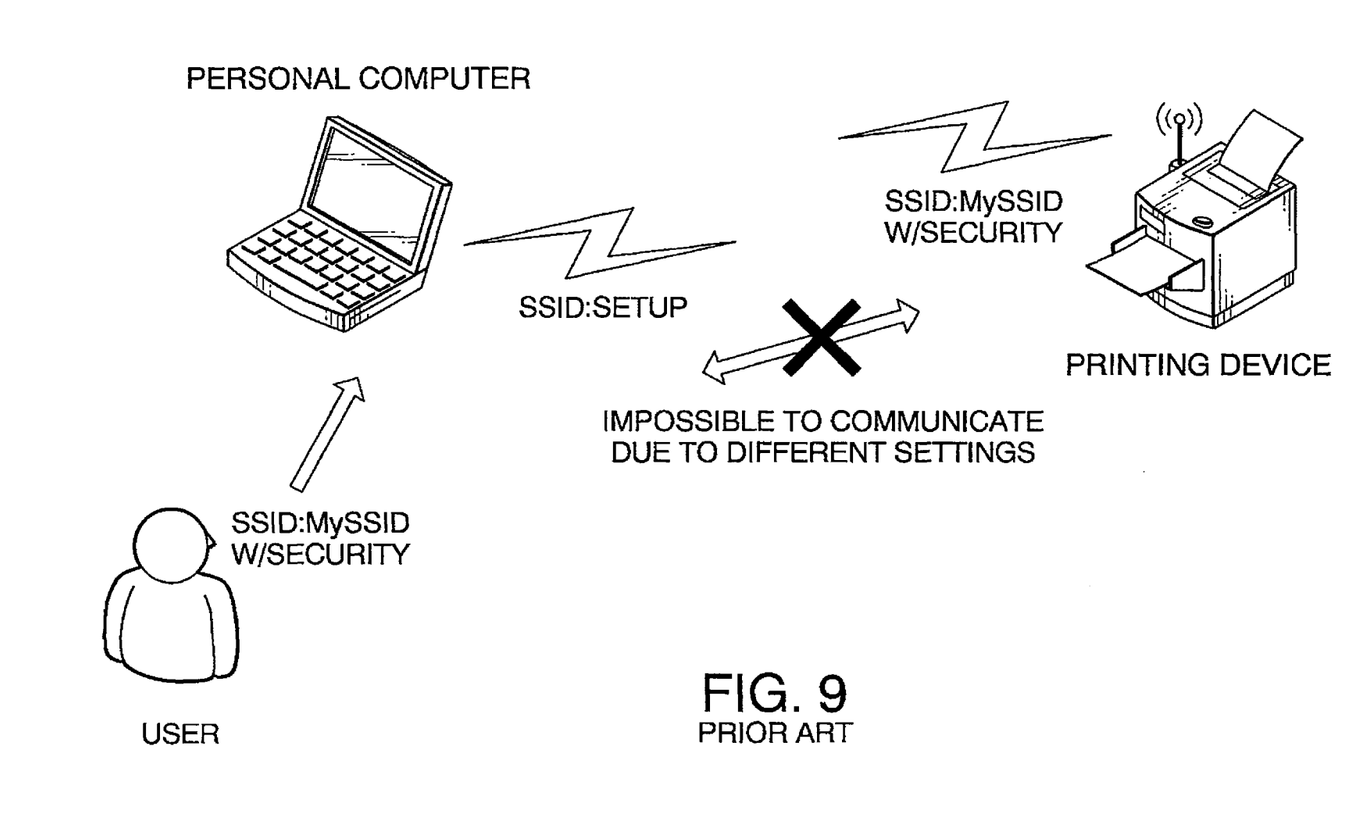
FIG. 9 is an illustration schematically showing a conventional setting procedure after the setup wizard being executed.

As shown in FIG. 9, after the setup wizard is completed, the wireless connection between the personal computer and the device is disconnected due to the wireless connection settings for the personal computer being different from those for the device.

Therefore, the user separately configures the settings identical to those for the device for the personal computer to reestablish the wireless connection between the personal computer and the device. Then, the personal computer recognizes the device to set a program necessary for using the device in the personal computer. It is noted that FIG. 9 is an illustration schematically showing a setting procedure after the conventional setup wizard has been terminated.

As aforementioned, in the conventional setting procedure, in spite of the same wireless connection settings being configured for the personal computer and the device, the settings for the personal computer and those for the device are individually configured. This requires a lot of effort of the user, and when the user configures the settings for the personal computer, the user has a possible risk of forgetting the settings for the device, or configuring inappropriate settings for the personal computer.

When the user forgets the settings for the device, or the settings the user remembers are inappropriate, it is impossible to reestablish the wireless connection between the personal computer and the device. Consequently, the personal computer cannot recognize the device, or configure the settings necessary for using the device. Especially, in the case of a security setting, which is one of the settings, being completed once, there is no way to confirm a password or an encryption key. Therefore, the user has to configure the settings again from the beginning.

Namely, it is difficult to certainly set the computer capable of using the device wirelessly connected therewith according to the conventional setting procedure.

SUMMARY

Aspects of the present invention are advantageous in that one or more improved techniques that allow a user to certainly set a computer capable of using a device wirelessly connected therewith can be provided.

DETAILED DESCRIPTION

It is noted that various connections are set forth between elements in the following description. It is noted that these connections in general and, unless specified otherwise, may be direct or indirect and that this specification is not intended to be limiting in this respect.

General Overview

According to aspects of the present invention, there is provided a computer program product comprising computer readable instructions that cause a computer configured wirelessly connectable with at least one device to execute a wireless connection setting process comprising: establishing a wireless connection with the at least one device; transmitting externally inputted settings of the wireless connection to the at least one device; and configuring the same settings as the settings transmitted to the at least one device for the computer.

By making the computer execute the above wireless connection setting process, the computer establishes the wireless connection with the at least one device, transmits the externally inputted settings to the at least one device, and configure the same settings as the transmitted settings for the computer.

Namely, according to the aforementioned computer program product, the computer does not only transmit the settings to the at least one device to configure the settings for the at least one device, but also configure the same settings as the transmitted settings as they are for the computer. Therefore, the wireless connection between the computer and the at least one device can be maintained even after the settings being transmitted.

In other words, the computer can keep recognizing the at least one device, maintaining the wireless connection with the at least one device even after the settings being transmitted. Accordingly, it is possible to certainly set the computer capable of using the at least one device wirelessly connected therewith.

Optionally, the wireless connection setting process may further comprise setting a program that may be used for utilizing the at least one device for the computer.

According to some aspects, following configuring the wireless connection settings, the computer sets the program that may be used for utilizing the at least one device therefore. Thereby, the computer can utilize the at least one device immediately after the wireless connection setting process is completed.

Optionally, the wireless connection setting process may further comprise receiving identification data for identifying the at least one device wirelessly connected with the computer in said establishing the wireless connection from the at least one device, and setting the at least one device as a target device to be utilized by the computer based upon the identification data received in said receiving the identification data.

According to some aspects, the computer receives the identification data from the at least one device wirelessly connected therewith, and sets the at least one device wirelessly connected therewith as the target device to be utilized by the computer based upon the received identification data. Therefore, the computer can immediately utilize the at least one device for which the settings have been configured.

Alternatively or optionally, the wireless connection setting process may further comprise recognizing the at least one device wirelessly connectable with the computer based upon the settings configured in said configuring; and setting the at least one device recognized in said recognizing as a target device to be utilized by the computer.

According to some aspects, the computer recognizes the at least one device wirelessly connectable therewith based upon the settings, and set the recognized device as the target device to be utilized by the computer. Thereby, the computer can immediately utilize the at least one device for which the settings have been configured.

Further optionally, the wireless connection setting process may further comprise receiving identification data for identifying the at least one device wirelessly connected with the computer in said establishing the wireless connection from the at least one device, and storing the identification data received in said receiving. Optionally, said setting may comprise setting the at least one device specified based upon the identification data stored in said storing as the target device to be utilized by the computer, in response to two or more devices being recognized in said recognizing.

According to some aspects, the computer receives the identification data from the at least one device wirelessly connected therewith, and stores it. Meanwhile, when the computer recognizes two or more devices wirelessly connectable therewith based upon the settings, the computer sets the at least one device specified based upon the stored identification data as the target device to be utilized by the computer. For this reason, even though the computer recognizes two or more devices wirelessly connectable therewith based upon the settings, the computer can set the specified device as the target device to be utilized thereby immediately after the settings have been configured.

Alternatively or optionally, the wireless connection setting process may further comprise receiving type information data showing the type of the at least one device wirelessly connected with the computer in said establishing the wireless connection from the at least one device. Optionally, said setting the program may comprise setting a program corresponding to the type of the at least one device specified based upon the type information data received in said receiving the type information data for the computer as the program that may be used for utilizing the at least one device.

According to some aspects, the computer receives the type information data from the at least one device wirelessly connected therewith, and sets the program corresponding to the type of the at least one device specified based upon the received type information data. Therefore, it is possible to configure the settings corresponding to the type of the at least one device for the at least one device.

Optionally, the wireless connection setting process may further comprise recognizing the at least one device wirelessly connectable with the computer based upon the settings configured in said configuring, and setting a program that may be used for utilizing the at least one device recognized in said recognizing for the computer.

According to some aspects, the computer recognizes the at least one device wirelessly connectable therewith based upon the settings, and sets the program that may be used for utilizing the recognized device therefore. Accordingly, it is possible to configure the settings corresponding to the recognized device for the computer.

Still optionally, the wireless connection setting process may further comprise receiving identification data for identifying the at least one device wirelessly connected with the computer in said establishing the wireless connection from the at least one device, and storing the identification data received in said receiving. Optionally, said setting the program may comprise setting a program corresponding to the at least one device specified based upon the identification data stored in said storing that may be used for utilizing the at least one device for the computer.

According to some aspects, the computer receives the identification data from the at least one device wirelessly connected therewith, and stores it. Meanwhile, when the computer recognizes two or more devices wirelessly connectable therewith based upon the settings, the computer sets the program corresponding to the at least one device specified based upon the stored identification data therefore. For this reason, it is possible to configure the settings corresponding to the device wirelessly connected with the computer for the computer.

Optionally, said configuring may comprise judging whether the settings are configured for the computer, and configuring the setting in response to the settings being not judged to be configured for the computer.

According to some aspects, only when the settings are not configured for the computer, the settings are configured for the computer. Therefore, the computer only configures the settings of the wireless connection for the at least one device wirelessly connected therewith, and it is possible to maintain settings, of the wireless connection with another device, which have already been configured for the computer.

Optionally, the wireless connection setting process may further comprise judging whether the at least one device wirelessly connected with the computer in said establishing the wireless connection is only one. Optionally, said configuring may comprise configuring the same settings as the settings transmitted to the at least one device for the computer in response to the at least one device wirelessly connected with the computer being judged to be one in said judging.

According to some aspects, when the at least one device wirelessly connected with the computer is one, the computer configures the settings therefore. Hence, it is prevented that, in spite of the user wishing to make the computer communicate with an arbitrary one of two or more devices wirelessly connected with the computer, the computer only communicates with a specific device, and cannot communicate with the other devices. In addition, only by allowing a specific device that the user wishes to make communicate with the computer to operate and allowing the computer to execute the wireless connection setting process, the user can easily set the computer to communicate with the specific device.

Optionally, the wireless connection setting process may further comprise allowing a user select whether to configure the same settings as the settings transmitted to the at least one device for the computer. In this case, said configuring may comprise configuring the same settings as the settings transmitted to the at least one device for the computer, in response to the user selecting configuring the same settings as the settings transmitted to the at least one device for the computer in said allowing.

According to some aspects, the computer configures the settings therefore, when the user selects configuring the settings for the computer. For this reason, the user only configures the settings of the wireless connection for the at least one device wirelessly connected with the computer, and can select whether to maintain settings of the wireless connection with another device that have already been configured for the computer.

Optionally, the settings may be used for at least the computer being directly and wirelessly connected with the at least one device. Optionally, the settings may be used for at least the computer being wirelessly connected with the at least one device via a relay device configured to relay data wirelessly transmitted between the computer and the at least one device.

According to another aspect of the present invention, there is provided a computer program product comprising computer readable instructions that cause a computer configured wirelessly connectable with at least one device to execute a wireless connection setting process comprising: establishing a wireless connection with the at least one device; setting a program that may be used for utilizing the at least one device for the computer; and transmitting externally inputted settings of the wireless connection to the at least one device.

By making the computer execute the aforementioned wireless connection setting process, the computer establishes the wireless connection with the at least one device, set the program that may be used for utilizing the at least one device therefore, and thereafter, transmits the externally inputted settings to the at least one device.

Namely, according to the aforementioned wireless connection setting process, the computer transmits the settings to the at least one device, after the program that may be used for utilizing the at least one device is set for the computer with the at least one device being recognized. Therefore, even though the wireless connection between the computer and the at least one device is disconnected after the settings being transmitted, it is possible to certainly set the computer capable of utilizing the at least one device wirelessly connected with the computer.

According to a further aspect of the present invention, there is provided a computer program product comprising computer readable instructions that cause a computer configured wirelessly connectable with at least one device to execute a wireless connection setting process comprising: establishing a wireless connection with the at least one device; receiving type information data showing the type of the at least one device wirelessly connected with the computer in said establishing the wireless connection from the at least one device; transmitting externally inputted settings of the wireless connection to the at least one device; and setting a program corresponding to the type of the at least one device specified based upon the type information data received in said receiving for the computer as a program that may be used for utilizing the at least one device.

By making the computer execute the aforementioned wireless connection setting process, the computer establishes the wireless connection with the at least one device, and receives the type information data from the at least one device wirelessly connected with the computer. Then, the computer transmits the externally inputted settings to the at least one device, and sets the program corresponding to the type of the device specified based upon the received type information data for the computer as the program that may be used for utilizing the at least one device.

In other words, according to the aforementioned wireless connection setting process, the computer establishes the wireless connection with the at least one device, receives the type information data, and thereafter, transmits the settings to the at least one device. Therefore, even though the wireless connection between the computer and the at least one device is disconnected after the settings are transmitted, the program corresponding to the type of the at least one device can be set for the computer.

Namely, according to some aspects, even though the wireless connection with the at least one device is disconnected, it is possible to certainly set the computer capable of utilizing the at least one device wirelessly connected with the computer. It is noted that the computer may set the program after or before the settings being transmitted.

According to a further aspect of the present invention, there is provided a computer program product comprising computer readable instructions that cause a computer configured wirelessly connectable with at least one device to execute a wireless connection setting process comprising: establishing a wireless connection with the at least one device; transmitting externally inputted settings of the wireless connection to the at least one device; recognizing the at least one device wirelessly connectable with the computer based upon the settings configured in said configuring; and setting a program that may be used for utilizing the at least one device recognized in said recognizing for the computer.

By making the computer the aforementioned wireless connection setting process, the computer establishes the wireless connection with the at least one device, and transmits the externally inputted settings to the at least one device. Then, the computer recognizes the at least one device wirelessly connectable with therewith based upon the settings, and sets the program that may be used for utilizing the recognized device for the computer.

Namely, according to the aforementioned wireless connection setting process, even after the settings being transmitted, the computer can recognize the at least one device, and set the program corresponding to the recognized device therefore. Thereby, it is possible to certainly set the computer capable of utilizing the at least one device wirelessly connected with the computer.

According to a further aspect of the present invention, there is provided a computer program product comprising computer readable instructions that cause a computer configured wirelessly connectable with at least one device to execute a wireless connection setting process comprising: establishing a wireless connection with the at least one device; specifying a setting target device for which settings of the wireless connection are to be configured in the at least one device; receiving identification data for identifying the setting target device specified in said specifying, from the setting target device; transmitting externally inputted settings of the wireless connection with the setting target device to the setting target device; configuring the same settings as the settings transmitted to the setting target device for the computer; setting the setting target device as a usage target device to be utilized by the computer based upon the identification data received in said receiving the identification data; and setting a program that may be used for utilizing the usage target device set in said setting.

By making the computer execute the aforementioned wireless connection setting process, the computer establishes the wireless connection with the at least one device, specifies the setting target device for which the settings of the wireless connection are to be configured in the at least one device, and receives the identification data for identifying the specified setting target device from the setting target device. Then, the computer transmits the externally inputted settings of the wireless connection with the setting target device to the setting target device, and configures the same settings as the settings transmitted to the setting target device therefore. Thereafter, the computer sets the setting target device as a usage target device to be utilized by the computer based upon the received identification data, and sets the program that may be used for utilizing the usage target device.

Namely, according to the aforementioned computer program product, the computer does not only transmit the settings to the setting target device to configure the settings for the setting target device, but also configure the same settings as the transmitted settings as they are for the computer. Therefore, the wireless connection between the computer and the setting target device can be maintained even after the settings being transmitted.

In other words, the computer can keep recognizing the setting target device, maintaining the wireless connection with the setting target device even after the settings being transmitted. Accordingly, it is possible to certainly set the computer capable of using the setting target device wirelessly connected therewith.

The aforementioned computer program products may be a ROM or a backup RAM to be incorporated into the computer. In other words, the aforementioned computer readable instructions, which cause the computer to execute the wireless connection setting process, may be stored in the ROM or the backup RAM to be incorporated into the computer, and may be used with being loaded from the ROM or the backup RAM to the computer Further, the aforementioned computer readable instructions may be used with being loaded to the computer via the network.

In addition, the aforementioned computer readable instructions may be stored in a computer readable recording medium. More specifically, according to a further aspect of the present invention, there is provided a recording medium comprising computer readable instructions stored therein that cause a computer configured wirelessly connectable with at least one device to execute a wireless connection setting process comprising: establishing a wireless connection with the at least one device; transmitting externally inputted settings of the wireless connection to the at least one device; and configuring the same settings as the settings transmitted to the at least one device for the computer.

The above recording medium can bring the same effects as those of the aforementioned computer program products.

It is noted that there are cited as examples of the recording medium a flexible disk (FD), Magneto-Optical disk (MO), DVD, CD-ROM, Blu-Ray disk, HD-DVD, hard disk drive, and memory card.

According to a further aspect of the present invention, there is provided a computer comprising the aforementioned computer readable instructions installed therein. More specifically, a computer, configured wirelessly connectable with at least one device, comprises computer readable instructions incorporated therein that cause the computer to execute a wireless connection setting process comprising: establishing a wireless connection with the at least one device; transmitting externally inputted settings of the wireless connection to the at least one device; and configuring the same settings as the settings transmitted to the at least one device for the computer. The above computer can bring the same effects as those of the aforementioned computer program products, or the aforementioned recording medium.

According to a further aspect of the present invention, there is provided a wireless network comprising at least one computer as aforementioned and at least one device configured wirelessly connectable with the at least one computer. More specifically, a wireless network comprises at least one computer and at least one device. The at least one computer is configured wirelessly connectable with the at least one device. The at least one computer comprises computer readable instructions incorporated therein that cause the at least one computer to execute a wireless connection setting process comprising: establishing a wireless connection with the at least one device; transmitting externally inputted settings of the wireless connection to the at least one device; and configuring the same settings as the settings transmitted to the at least one device for the at least one computer. The above wireless network can bring the same effects as those of the aforementioned computer program products, the aforementioned recording medium, or the aforementioned computer.

Illustrative Examples

Figure 1:
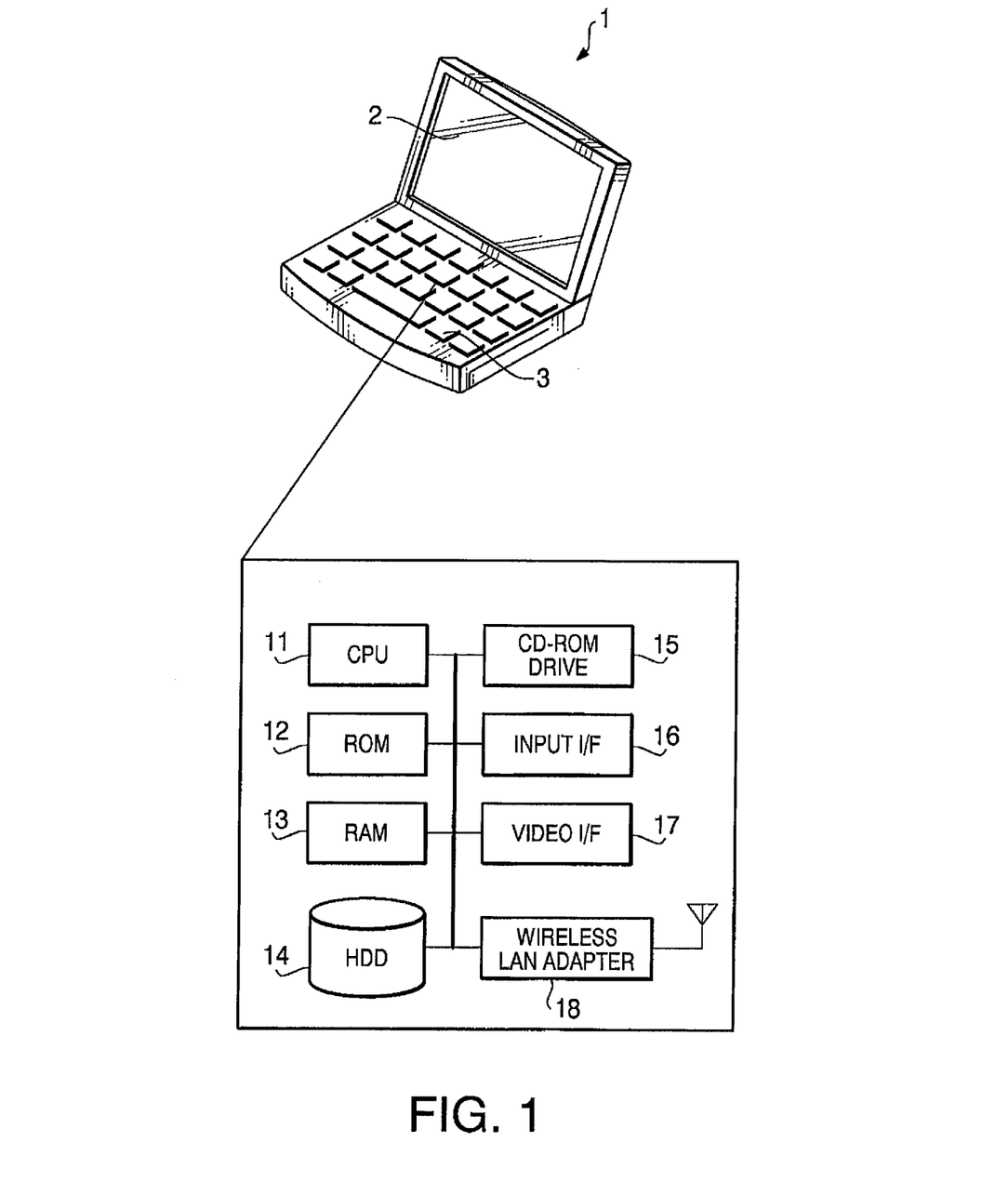
FIG. 1 schematically shows a configuration of a personal computer (PC) according to one or more aspects of the present invention.

Hereinafter, an illustrative example according to the present invention will be explained with reference to the accompanying drawings. FIG. 1 schematically shows a configuration of a personal computer 1 according to one or more aspects of the present invention. As shown in FIG. 1, a personal computer (PC) 1, provided integrally with a display device 2 and a keyboard 3, is configured as a so-called notebook personal computer.

There are incorporated in the PC 1 a CPU 11 that executes various processes to be performed by the PC 1, a ROM 12 that stores a program for boot processing (BIOS) to be executed by the CPU 11 when booting the PC 1, a RAM 13 employed as a memory area when the CPU 11 executes the various processes, an HDD 14 that stores an operating system and programs for the various processes to be executed by the CPU 11, a CD-ROM drive 15 that reads data stored in an externally inserted CD-ROM, an input I/F (interface) 16 through which input signals, issued from input devices such as a keyboard 3 and mouse (not shown) connected with the PC 1, are inputted to the CPU 11, a video I/F (interface) 17 through which a display based upon a command issued from the CPU 11 is displayed on the display device 2, and a wireless LAN adapter 18 that establishes a wireless connection between the CPU 11 and an external device on the basis of predetermined wireless communication standards (IEEE 802.11 in this illustrative example). The above constituent elements incorporated in the PC 1 are interconnected.

Figure 2:
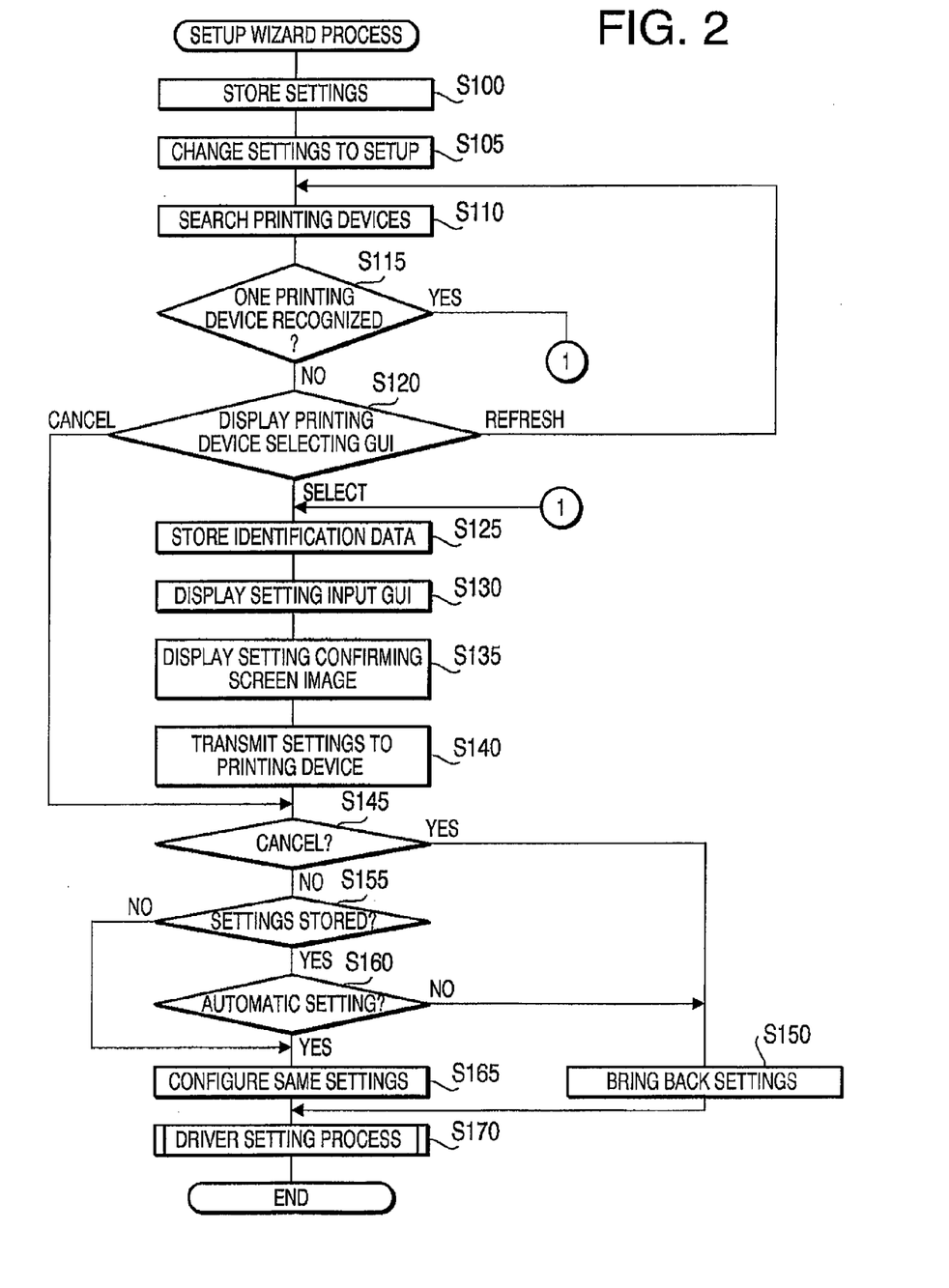
FIG. 2 is a flowchart showing a procedure of an initial setting process executed by a CPU in accordance with one or more aspects of the present invention.

Hereinafter, a process according to the present invention, among the various processes executed by the CPU 11, will be described in detail. FIG. 2 is a flowchart showing a procedure of an initial setting process executed by the CPU 11. It is noted that a program for executing this process is stored in the CD-ROM such that the CPU 11 can read the program, together with a driver as a program for controlling a printing device such as a printer and MFP (Multi Function Peripheral). When the CD-ROM is inserted into the CD-ROM drive 15, the CPU 11 begins to read data stored in the CD-ROM to execute the process.

As shown in FIG. 2, in this process, first, settings for the wireless LAN adaptor 18 (in this case, a setting of the wireless connection with a wireless access point in a wireless network that the PC 1 is joining) are stored (evacuated) in the RAM 13 (S100). Then, settings originally configured for the wireless LAN adaptor are changed to SETUPs that are default settings (S105). Thereby, the PC 1 is allowed to leave from the wireless network that the PC 1 has been joining until the process is executed, which enables the PC 1 to establish the direct wireless connection with a printing device for which the wireless connection settings have not been configured.

A request instruction for requesting identification data for identifying the printing device (in this illustrative example, a MAC address or a model name) is transmitted to find the printing devices located around the PC 1 for which the wireless connection settings have not been configured (S110). Thereafter, it is judged whether the printing device, which is recognized by the identification data thereof having been returned in response to the request instruction, is only one (S115).

When only one printing device is recognized (S115: Yes), the recognized printing device is set as a setting target device for which the wireless connection settings are to be configured to directly bring the process forward to the below-mentioned step of S125. Meanwhile, when two or more printing devices are recognized (S115: No), a printing device selecting GUI (see FIG. 4) for the user selecting a printing device to be set as the setting target device for which the wireless connection settings are to be configured is displayed on the display device 2 (S120).

Figure 4:
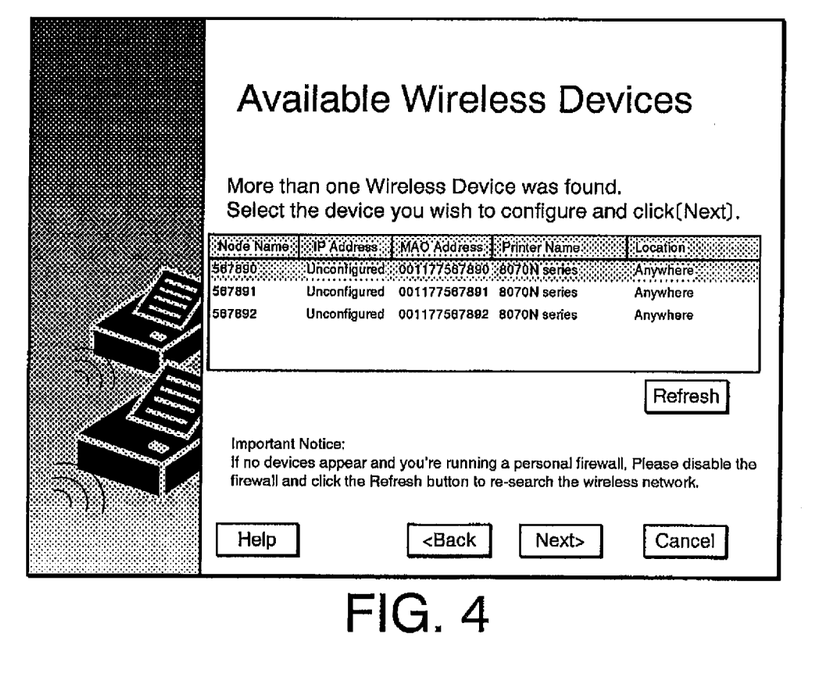
FIG. 4 is an illustration showing an example of a printing device selecting GUI displayed on a display device in accordance with one or more aspects of the present invention.

When "Cancel" is selected on the printing device selecting GUI (S120: Cancel), the process directly goes to the below-mentioned step of S145. When "Refresh" is selected on the printing device selecting GUI (S120: Refresh), the process is returned to the aforementioned step of S110.

When a printing device is selected on the printing device selecting GUI (S120: Select), the selected printing device is set as the setting target device for which the wireless connection settings are to be configured, and the identification data thereof is stored in the RAM 13 as the identification data of the setting target device (S125).

Figure 5:
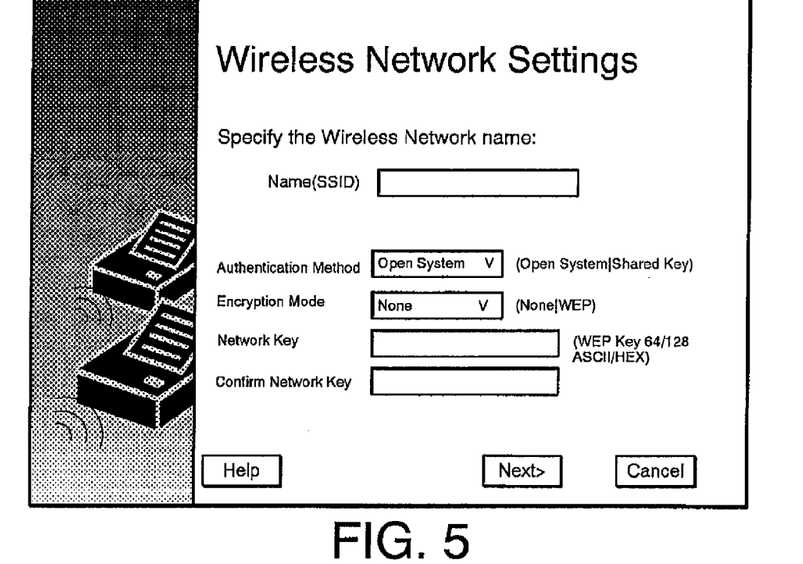
FIG. 5 is an illustration showing an example of a setting input GUI displayed on the display device in accordance with one or more aspects of the present invention.

Next, a setting input GUI (see FIG. 5), which is an input screen for the user inputting the wireless connection settings for the printing device set as the setting target device, is displayed on the display device 2 (S130), so that the user is allowed to input the settings. It is noted that, on the setting input GUI in this illustrative example, an SSID of the wireless access point that relays data wirelessly transmitted between the printing device and the PC 1, a transmitted data status of encrypted/non-encrypted, and/or an encryption key used for encrypting the transmitted data are set.

Figure 6:
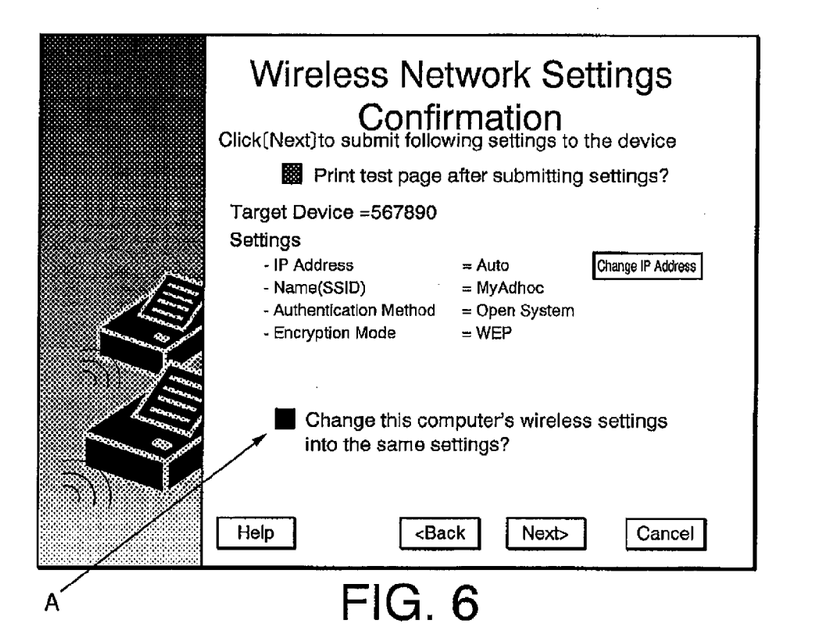
FIG. 6 is an illustration showing an example of a setting confirming screen image displayed on the display device in accordance with one or more aspects of the present invention.

When the input on the setting input GUI is completed, a setting confirming screen image (see FIG. 6) for allowing the user to confirm the inputted settings is displayed on the display device 2 (S135). It is noted that, on the setting confirming screen of this illustrative example, there is provided an automatic-setting-necessity setting portion (a portion indicated by an arrow A in FIG. 6) for the user setting whether to automatically configure the same settings for the PC 1 as those inputted on the setting input GUI. In this illustrative example, the automatic-setting-necessity setting portion is configured as a check box. When the black-colored check box is shown as a result of the user checking the check box with the keyboard 3 or the mouse, the CPU 11 performs the automatic setting as below-mentioned. Meanwhile, when only the outline of the check box is shown with the check box being unchecked, the CPU 1 does not perform the automatic setting as below-mentioned.

Then, when the confirmation on the setting confirming screen is completed, the settings inputted by the user on the setting input GUI is transmitted to the printing device (S140), it is judged whether "Cancel" has been selected on the printing device selecting GUI (S145).

Here, when "Cancel" has been selected (S145: Yes), the settings, which has been stored in the RAM 13 in the aforementioned step of S100, are returned to the wireless LAN adaptor 18 (S150), and the process proceeds to the below-mentioned step of S170.

On the other hand, when "Cancel" has not been selected (S145: No), it is confirmed whether the wireless connection settings are stored in the RAM 13 (S155). More specifically, by judging whether the wireless connection settings stored in the RAM 13 are the default settings, the CPU 11 confirms whether the settings that had been configured for the PC 1 before the process being executed are stored in the RAM 13.

When the settings are not stored (S155: No), the process directly goes to the below-mentioned step of S165. Meanwhile, when the settings are stored (S155: Yes), it is confirmed whether the automatic setting has been selected on the aforementioned setting input GUI (S160). When the automatic setting has not been selected (S160: No), the process goes to the aforementioned step of S150.

On the other hand, when the automatic setting has been selected (S160: Yes), the same settings as those transmitted to the printing device in the aforementioned step of S140 are configured for the wireless LAN adaptor 18 (S165), and then, the below-mentioned driver setting process is executed to terminate the process.

Figure 3:
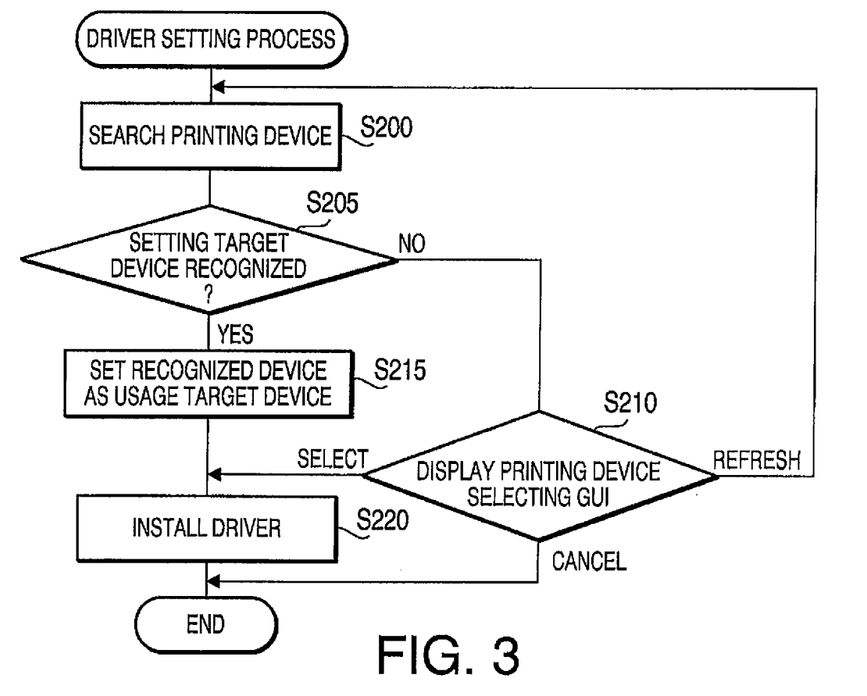
FIG. 3 is a flowchart showing a procedure of a driver setting process in accordance with one or more aspects of the present invention.

FIG. 3 is a flowchart showing a procedure of the driver setting process (S170). As shown in FIG. 3, in this process, first, the CPU 11 finds the printing devices located around the PC 1 (S200) with a request instruction for requesting the identification data being transmitted based upon the settings configured for the wireless LAN adaptor 18, so as to judge whether the printing device, which has been set as the setting target device in the step of S115 or S120 in the aforementioned setup wizard process, has been recognized (S205), More specifically, the CPU 11 judges whether the printing device set as the setting target device has been recognized, by confirming whether there is included the same identification data as the data stored in the RAM 13 in S125 of the aforementioned setup wizard process in the identification data transmitted by the printing devices in response to the request instruction.

When the printing device set as the setting target device is not recognized (S205: No), the aforementioned printing device selecting GUI is displayed on the display device 2 (S210). When "Cancel" is selected on the printing device selecting GUI (S210: Cancel), the process is immediately terminated.

Meanwhile, when "Refresh" is selected on the printing device selecting GUI (S210: Refresh), the process is returned to the aforementioned step of S200. When a printing device is selected on the printing device selecting GUI (S210: Select), the selected printing device is set as a usage target device to be used by the PC 1 to bring the process forward to the below-mentioned step of S220.

On the other hand, when the printing device set as the setting target device is recognized in S205 (S205: Yes), the printing device is set as the usage target device to be used by the PC 1 (S215). Then, a driver, corresponding to a model name in the identification data of the printing device set as the usage target device, is read out of the CD-ROM, and installed to the HDD 14 (S220) to terminate the process.

Figure 7:
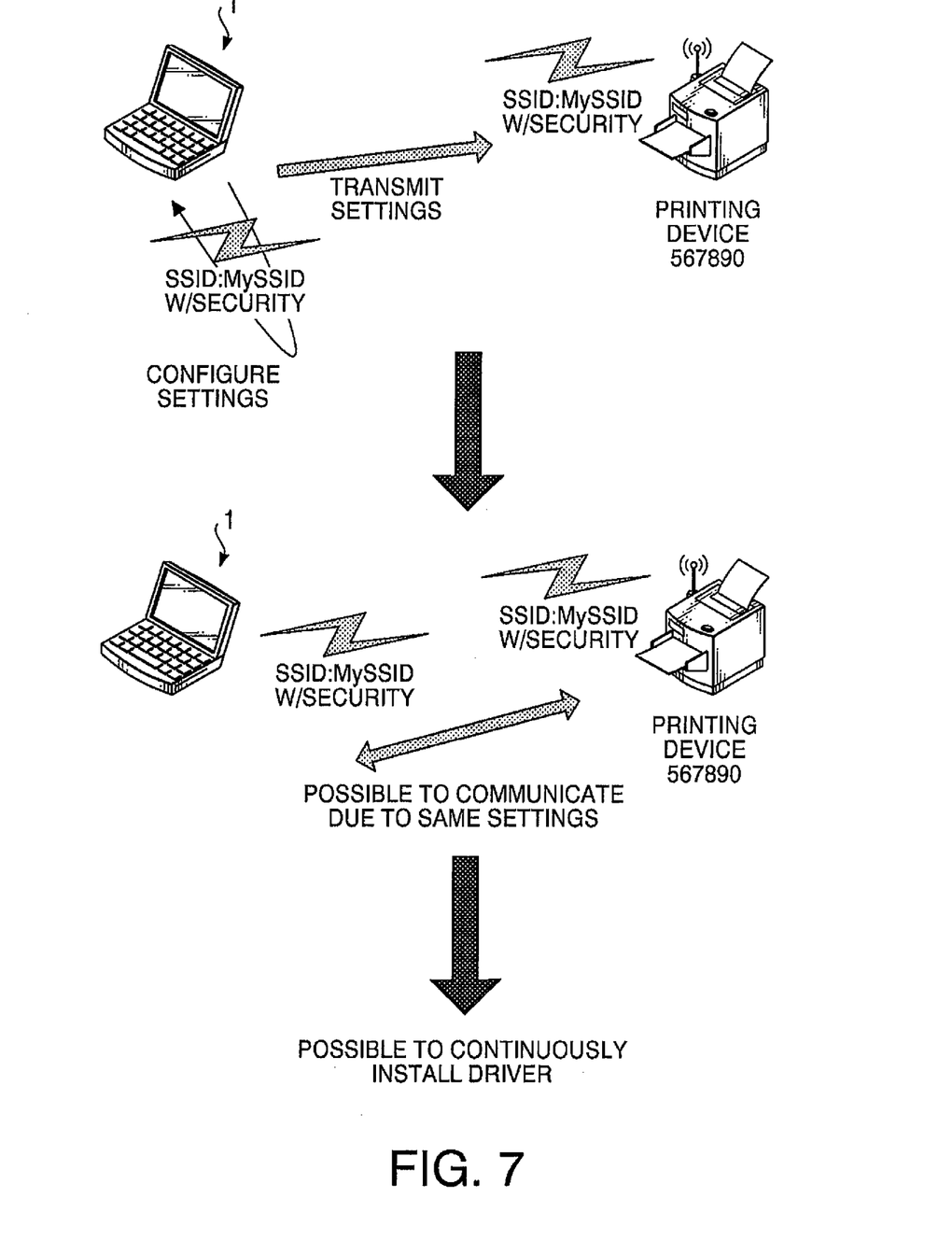
FIG. 7 schematically shows an operation of the PC in accordance with one or more aspects of the present invention.

By the aforementioned processes being executed by the CPU 11, the PC 1 of this illustrative example, as shown in FIG. 7, establishes the wireless connection with the printing device for which the wireless connection settings have not been configured, transmits the wireless connection settings externally inputted to the printing device set as the setting target device for which the wireless connection settings are to be configured, and configure the same settings as the settings transmitted to the printing device for the PC 1 itself in the case of the automatic setting being selected.

Namely, the PC 1 of this illustrative example does not only transmit the settings to the printing device set as the setting target device for which the wireless connection settings are to be configured to configure the wireless connection settings for the printing device, but also can configure the transmitted settings as they are for the PC 1 itself. Therefore, it is possible to maintain the wireless connection with the printing device after the settings being transmitted, certainly install the driver that is a program necessary for using the printing device, and thereby directly use the printing device for which the wireless connection settings have been configured. It is noted that FIG. 7 is an illustration schematically showing an operation of the PC 1.

In addition, after storing the identification data obtained from the printing device set as the setting target device for which the wireless connection settings are to be configured, and configuring wireless connection settings therefore, even though the PC 1 of this illustrative example recognizes two or more printing devices capable of establishing the wireless connection with the PC 1 based upon the wireless connection settings, when there is found in the recognized printing devices a printing device corresponding to the identification data stored by the PC 1, the printing device is set as the usage target device to be used for the PC 1. Therefore, the printing device can be used immediately after the wireless connection settings have been configured.

Further, in this illustrative example, the PC 1 sets the driver corresponding to the model name of the printing device set as the usage target device in the recognized printing devices for the PC 1 itself. Thereby, the PC 1 can configure the settings corresponding to the type of the printing device set as the usage target device therefore.

Further, in this illustrative example, since the PC 1 configures the same settings as the settings transmitted to the printing device therefore only when the wireless connection settings configured by the user is not stored, the settings of the wireless connection with another printing device that have already been configured for the PC 1 can be maintained.

Furthermore, in this illustrative example, when the wireless connection settings configured by the user is stored, the PC 1 configures the same settings as the settings transmitted to the printing device therefore only in the case of the automatic setting being selected. Thereby, the user can select whether to maintain the settings of the wireless connection with another printing device that have already been configured for the PC 1.

Moreover, in this illustrative example, when there is only one printing device for which the wireless connection settings have not been configured, the PC 1 sets the printing device as the setting target device for which the wireless connection settings are to be configured. Hence, it can be prevented that, in spite of the user wishing to make the PC 1 communicate with arbitrary one of two or more printing devices wirelessly connected with the PC 1, the PC 1 communicates with one specific printing device, and consequently, cannot communicate with one of the other devices. In addition, only by making one specific printing device operate and making the PC 1 execute the program for the setup wizard process, the user can easily set the PC 1 to communicate with the one specific printing device.

Hereinabove, the illustrative example according to the present invention has been explained. However, the present invention is not limited to the aforementioned illustrative example. It is needless to say that various modifications may be possible as far as they are within the technical teachings according to the present invention.

For example, in the aforementioned illustrative example, the wireless connection settings are transmitted to the printing device, and thereafter, the driver is installed. However, the wireless connection settings may be transmitted to the printing device after the driver being installed.

In this case, the PC 1 installs the driver with the printing device being recognized, and then, the settings are transmitted to the printing device. Therefore, even though the wireless connection with the printing device is disconnected by transmitting the settings, it is possible to certainly set the PC 1 capable of using the printing device wirelessly connected therewith.

Further, in the aforementioned illustrative example, when the printing device set as the setting target device is recognized after transmitting the settings, the driver corresponding to the type of the printing device is installed. However, even though the printing device set as the setting target device is not recognized, the driver corresponding to the type of the printing device set as the setting target device may be installed based upon the model name included in the identification data stored in the RAM 13.

In this case, even though the wireless connection with the printing device is disconnected after transmitting the settings, the driver corresponding to the type of the printing device can be installed into the PC 1. Namely, even when the wireless connection with the printing device is disconnected, it is possible to certainly set the PC 1 capable of using the printing device wirelessly connected therewith.

Further, in the aforementioned illustrative example, when the CD-ROM is inserted, the wireless connection setting program is executed. However, the wireless connection setting program may be configured to be executed when an external request for configuring the settings of the wireless connection with the printing device is received.

Furthermore, in the aforementioned illustrative example, the programs of the setup wizard process and the driver are stored in the CD-ROM. However, the programs may be stored in one of the other recording mediums such as a flexible disk (FD), Magneto-Optical disk (MO), DVD, Blu-Ray disk, HD-DVD, hard disk drive (HDD), and memory card.

Moreover, in the aforementioned illustrative example, the present invention is applied when the PC 1 is wirelessly connected with the printing device, and set capable of using the printing device wirelessly connected therewith. However, the present invention may be applied when the PC 1 is wirelessly connected with one or more devices of the other devices such as a scanner, facsimile machine, camera (especially, digital camera), network storage, projector, multi function device provided with two or more functions of the aforementioned functions, and multi function device provided with the printing device function and one or more functions of the aforementioned functions, and set capable of using the one or more devices wirelessly connected therewith.

What is claimed is:

1. A non-transitory computer readable medium storing computer readable instructions that cause a computer which is configured to be wirelessly connectable with at least one device in accordance with wireless settings, to execute a wireless connection setting process comprising:

establishing a temporary wireless connection with the at least one device;

accepting externally inputted settings for a wireless connection;

transmitting the externally inputted settings accepted in said accepting step, to the at least one device via the temporary wireless connection; and updating the wireless settings with the same settings as the settings transmitted to the at least one device;

determining whether wireless setting are stored in the computer; and configuring the same settings only in response to determining that the wireless settings are not stored in the computer and determining that a user instruction to update the wireless settings has been issued even when the wireless settings are stored in the computer.

2. The computer readable medium according to claim 1, wherein the wireless connection setting process further comprises setting a program for utilizing the at least one device for the computer.

3. The computer readable medium according to claim 2, wherein the wireless connection setting process further comprises:

receiving identification data for identifying the at least one device wirelessly connected with the computer in said establishing the wireless connection from the at least one device; and setting the at least one device as a target device to be utilized by the computer based upon the identification data received in said receiving the identification data.

4. The computer readable medium according to claim 2, wherein the wireless connection setting process further comprises:

recognizing the at least one device wirelessly connectable with the computer based upon the settings configured in said configuring; and setting the at least one device recognized in said recognizing as a target device to be utilized by the computer.

5. The computer readable medium according to claim 4, wherein the wireless connection setting process further comprises:

receiving identification data for identifying the at least one device wirelessly connected with the computer in said establishing the wireless connection from the at least one device; and storing the identification data received in said receiving, and wherein said setting comprises setting the at least one device specified based upon the identification data stored in said storing as the target device to be utilized by the computer, in response to two or more devices being recognized in said recognizing.

6. The computer readable medium according to claim 2, wherein the wireless connection setting process further comprises receiving type information data showing the type of the at least one device wirelessly connected with the computer in said establishing the wireless connection from the at least one device, and wherein said setting the program comprises setting a program corresponding to the type of the at least one device specified based upon the type information data received in said receiving the type information data for the computer as the program for utilizing the at least one device.

7. The computer readable medium according to claim 1, wherein the wireless connection setting process further comprises:

recognizing the at least one device wirelessly connectable with the computer based upon the settings configured in said configuring; and setting a program for utilizing the at least one device recognized in said recognizing for the computer.

8. The computer readable medium according to claim 7, wherein the wireless connection setting process further comprises:

receiving identification data for identifying the at least one device wirelessly connected with the computer in said establishing the wireless connection from the at least one device; and storing the identification data received in said receiving, and wherein said setting the program comprises setting a program corresponding to the at least one device specified based upon the identification data stored in said storing for utilizing the at least one device for the computer.

9. The computer readable medium according to claim 1, wherein said configuring comprises:

judging whether the settings are configured for the computer; and configuring the setting only in response to the settings being not judged not to be configured for the computer.

10. The computer readable medium according to claim 1, wherein the wireless connection setting process further comprises judging whether the at least one device wirelessly connected with the computer in said establishing the wireless connection is only one, and wherein said configuring comprises configuring the same settings as the settings transmitted to the at least one device for the computer in response to the at least one device wirelessly connected with the computer being judged to be one in said judging.

11. The computer readable medium according to claim 1, wherein the wireless connection setting process further comprises allowing a user select whether to configure the same settings as the settings transmitted to the at least one device for the computer, and wherein said configuring comprises configuring the same settings as the settings transmitted to the at least one device for the computer, in response to the user selecting configuring the same settings as the settings transmitted to the at least one device for the computer in said allowing.

12. The computer readable medium according to claim 1, wherein the settings is used for at least the computer being directly and wirelessly connected with the at least one device.

13. The computer readable medium according to claim 1, wherein the settings is used for at least the computer being wirelessly connected with the at least one device via a relay device configured to relay data wirelessly transmitted between the computer and the at least one device.

14. The computer readable medium according to claim 1, further comprising the step of re-establishing the temporary wireless connection with the same setting as the settings transmitted to the at least one device;

determining whether wireless setting are stored in the computer;

configuring the same settings only in response to determining that the wireless settings are not stored in the computer; and determining that a user instruction to update the wireless settings has been issued even when the wireless settings are stored in the computer.

15. A non-transitory computer readable medium storing computer readable instructions that cause a computer which is configured to be wirelessly connectable with at least one device in accordance with wireless settings, to execute a wireless connection setting process comprising:

establishing a temporary wireless connection with the at least one device;

accepting externally inputted settings for a wireless connection;

specifying a setting target device for which settings of the wireless connection are to be configured in the at least one device;

receiving identification data for identifying the setting target device specified in said specifying, from the setting target device via the temporary wireless connection;

transmitting the externally inputted settings accepted in said accepting step, to the setting target device via the temporary wireless connection;

re-establishing the temporary wireless connection with the same settings as the settings transmitted to the setting target device;

transmitting a request for identification data for identifying the at least one device to the at least one device via the re-established temporary wireless connection;

setting a device of the at least one device that has transmitted identification data identical to the received identification data for identifying the setting target device in response to the request transmitted in said request transmitting step, as a usage target device to be utilized by the computer; and setting a program for utilizing the usage target device set in said setting.

16. A wireless network, comprising at least one computer and at least one device, the at least one computer which is configured to be wirelessly connectable with the at least one device in accordance with wireless settings, wherein the at least one computer comprises computer readable instructions stored thereon that cause the at least one computer to execute a wireless connection setting process comprising:

establishing a temporary wireless connection with the at least one device, by configuring temporary settings as the wireless settings;

accepting externally inputted settings for a wireless connection;

specifying a setting target device for which settings of the wireless connection are to be configured in the at least one device;

receiving identification data for identifying the setting target device specified in said specifying, from the setting target device;

transmitting the externally inputted settings accepted in said accepting step, to the setting target device via the temporary wireless connection;

updating the temporary settings with the same settings as the settings transmitted to the setting target device;

setting the setting target device as a usage target device to be utilized by the at least one computer based upon the identification data received in said receiving the identification data; and setting a program for utilizing the usage target device set in said setting.

17. The computer readable medium according to claim 14, further comprising the steps of:

receiving identification data for identifying the at least one device, from the at least one device to the at least one device via the temporary wireless connection;

transmitting a request for identification data for identifying the at least one device to the at least one device via the re-established temporary wireless connection;

setting a device of the at least one device that has transmitted identification data identical to the identification data received in said receiving in response to the request transmitted in said transmitting, as a usage target device to be utilized by the computer; and setting a program for utilizing the usage target device set in said setting.

18. A non-transitory computer readable medium storing computer readable instructions that cause a computer which is configured to be wirelessly connectable with at least one device in accordance with wireless settings, to execute a wireless connection setting process comprising:

establishing a temporary wireless connection with the at least one device;

accepting externally inputted settings for a wireless connection;

transmitting the externally inputted settings accepted in said accepting step, to the at least one device via the temporary wireless connection; and re-establishing the temporary wireless connection with the same setting as the settings transmitted to the at least one device.

* * * * *